United States Patent
Benson et al.

(10) Patent No.: US 7,630,620 B2
(45) Date of Patent: Dec. 8, 2009

(54) APPARATUS AND METHOD FOR MEASURING AN ACCELERATION TO DETERMINE A CAMERA DOME'S REQUIRED MOTOR HOLDING CURRENT

(75) Inventors: James F. Benson, Lancaster, OH (US); Judd D. Clover, Lancaster, OH (US); Douglas L. Ringer, LaGrange, KY (US)

(73) Assignee: Honeywell International Inc., Morristown, NJ (US)

( * ) Notice: Subject to any disclaimer, the term of this patent is extended or adjusted under 35 U.S.C. 154(b) by 359 days.

(21) Appl. No.: 11/782,285

(22) Filed: Jul. 24, 2007

(65) Prior Publication Data
US 2009/0028536 A1    Jan. 29, 2009

(51) Int. Cl.
*G03B 17/00* (2006.01)
*H02K 5/24* (2006.01)

(52) U.S. Cl. .......................... 396/55; 396/427; 310/51; 348/143; 318/649

(58) Field of Classification Search .................. 396/53, 396/55, 427; 318/648, 649; 348/208.4, 208.5, 348/208.6, 208.7
See application file for complete search history.

(56) References Cited

U.S. PATENT DOCUMENTS 5,243,370 A * 9/1993 Slater .......................... 352/243
5,627,616 A * 5/1997 Sergeant et al. .............. 396/427
7,101,045 B2 * 9/2006 Romanoff et al. ............ 352/243
2005/0218857 A1 10/2005 Yamazaki et al.

FOREIGN PATENT DOCUMENTS

AU    2002100402 A4    7/2002

* cited by examiner

*Primary Examiner*—W. B. Perkey
*Assistant Examiner*—Dennis Hancock
(74) *Attorney, Agent, or Firm*—Husch Blackwell Sanders Welsh & Katz

(57) ABSTRACT

A system and method for reducing vibration in a dome camera security system is provided in which the heat produced by the motors is reduced as well. The dome camera system is equipped with an acceleration detecting circuit disposed in close proximity to the camera. The acceleration detecting circuit has an accelerometer for detecting accelerations in any of three directions (i.e., X-axis, Y-axis and Z-axis). As a vibration is induced on the camera by external forces, such as wind or traffic, the acceleration detection circuit detects accelerations indicative of the vibrations and in proportion to the magnitude of the vibration on the camera. A controlling circuit adjusts the holding current of the motors in response to the detected accelerations, thereby increasing the ability of the motors to maintain a particular camera position. When vibrations are detected to be minimal or not present, the holding current can be reduced thus reducing heat production by the motors.

11 Claims, 5 Drawing Sheets

APPARATUS AND METHOD FOR MEASURING AN ACCELERATION TO DETERMINE A CAMERA DOME'S REQUIRED MOTOR HOLDING CURRENT

I. FIELD OF THE INVENTION

The present invention relates generally to camera dome equipped surveillance systems. More specifically, the present invention relates to an apparatus and method for measuring an acceleration to determine a required motor holding current for a camera dome.

II. BACKGROUND OF THE DISCLOSURE

Camera domes equipped with stepper motors are often used in security and surveillance systems. Often, these dome cameras are placed in outdoor locations to monitor parking lots, road traffic conditions, bridges and tunnels, and other public spaces.

However, in these outdoor locations, the dome cameras are frequently subjected to vibration caused by passing vehicles and wind. The vibrations unfortunately can result in positional changes of the stepper motor. Hereinafter, the term vibration, as it applies to the movement of the dome camera, refers to unwanted movement of a stepper motor from one positional step to another caused by external forces such as passing traffic and wind.

A stepper motor provides the motive force for panning the camera to capture an extended field of view. Additionally, the stepper motor is required to hold the camera in a fixed position. Holding the camera stationary is accomplished by adjusting the torque produced by the stepper motor to balance any external forces impacting the camera. Since the dome camera system may not have any position feedback system for determining the exact position of the camera, external vibrations or forces that are of significant strength can cause the stepper motor to jump to the next step in its rotation. This jump would result in the loss of positional accuracy. To prevent this, the holding current of the stepper motor is increased so that the holding torque is larger than the external forces or vibrations.

Maintaining the stepper motor continuously powered so that a holding torque is produced often can result in excessive heat being generated. Constant excess heat can have an adverse effect on the camera dome's operation as well as degrade the life of the stepper motor. Therefore, the stepper motor should ideally produce a holding torque with a minimum current, thus reducing the amount of heat produced.

However, as mentioned above, camera domes are subject to random vibrational forces induced by traffic, weather and other environmental conditions. A stepper motor that is providing only a minimal holding torque, in many cases, will not be able to counter these external forces, resulting in excessive camera dome motion and loss of positional accuracy. Hereinafter, the term vibration, as it applies to the movement of the dome camera, refers to unwanted movement of a stepper motor from one positional step to another caused by external forces such as passing traffic and wind.

Accordingly, a need exists for an apparatus and method for determining the minimum holding torque required to hold a dome camera stationary at any given moment.

III. SUMMARY OF THE DISCLOSURE

An object of the present invention is to provide an apparatus that detects and measures an acceleration experienced by a dome camera, and based on the measured acceleration, determine a holding current for maintaining the dome camera stationary.

Another object of the present invention is to provide a method of detecting and measuring an acceleration experienced by a dome camera, determine the minimum current necessary for producing a holding torque sufficient for maintaining the dome camera stationary.

The present invention provides a security camera system capable of determining a required motor holding current for reducing unwanted positional motion. The system includes a security camera; at least one motor arranged for moving the security camera with respect to an axis; an acceleration detection circuit for detecting accelerations indicative of vibrations; The acceleration detection circuit detects accelerations along at least an axis of movement of the at least one stepper motor.

Additionally, the system includes a controlling circuit for controlling a holding current of the at least one stepper motor in response to a magnitude of the detected accelerations. The controlling circuit decreases said holding current when said magnitude of said detected accelerations is decreased, and increases said holding current when said magnitude of said detected accelerations is increased.

Also, the at least one stepper motor of the present invention may include an X-axis motor arranged to rotate said security camera about an X-axis; and a Y-axis motor arranged to rotate said security camera about an Y-axis.

A method of determining a required motor holding current for reducing unwanted positional motion of a security dome camera is also provided, which includes the steps of arranging at least one motor for rotating the security camera about an axis; detecting accelerations indicative of vibrations along the axis of rotation of the at least one motor; and controlling a holding current of the at least one motor in response to a magnitude of the detected accelerations.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
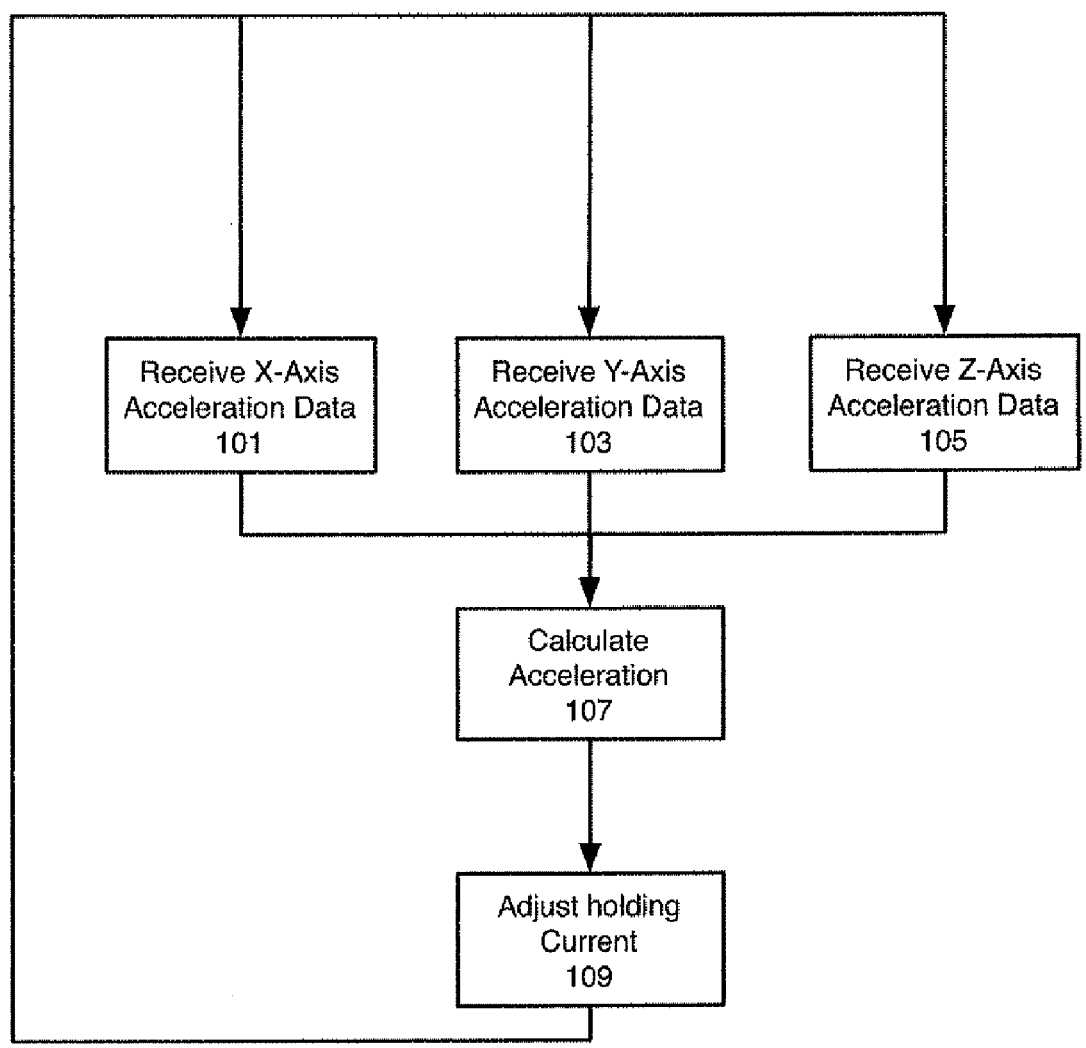
FIG. 1 illustrates a flow diagram of the process for performing an embodiment of the present invention.

Referring to FIG. 1, a process for implementing an embodiment of the present invention measuring an acceleration for determining a camera dome's required motor holding current is shown. Acceleration data is received for acceleration in the X-axis in step 101, Y-axis in step 103, and Z-axis 105. Based on the received acceleration data, the change in acceleration is calculated for each axis in step 107. The holding current is adjusted in step 109 to compensate for the calculated change in acceleration.

Figure 2:
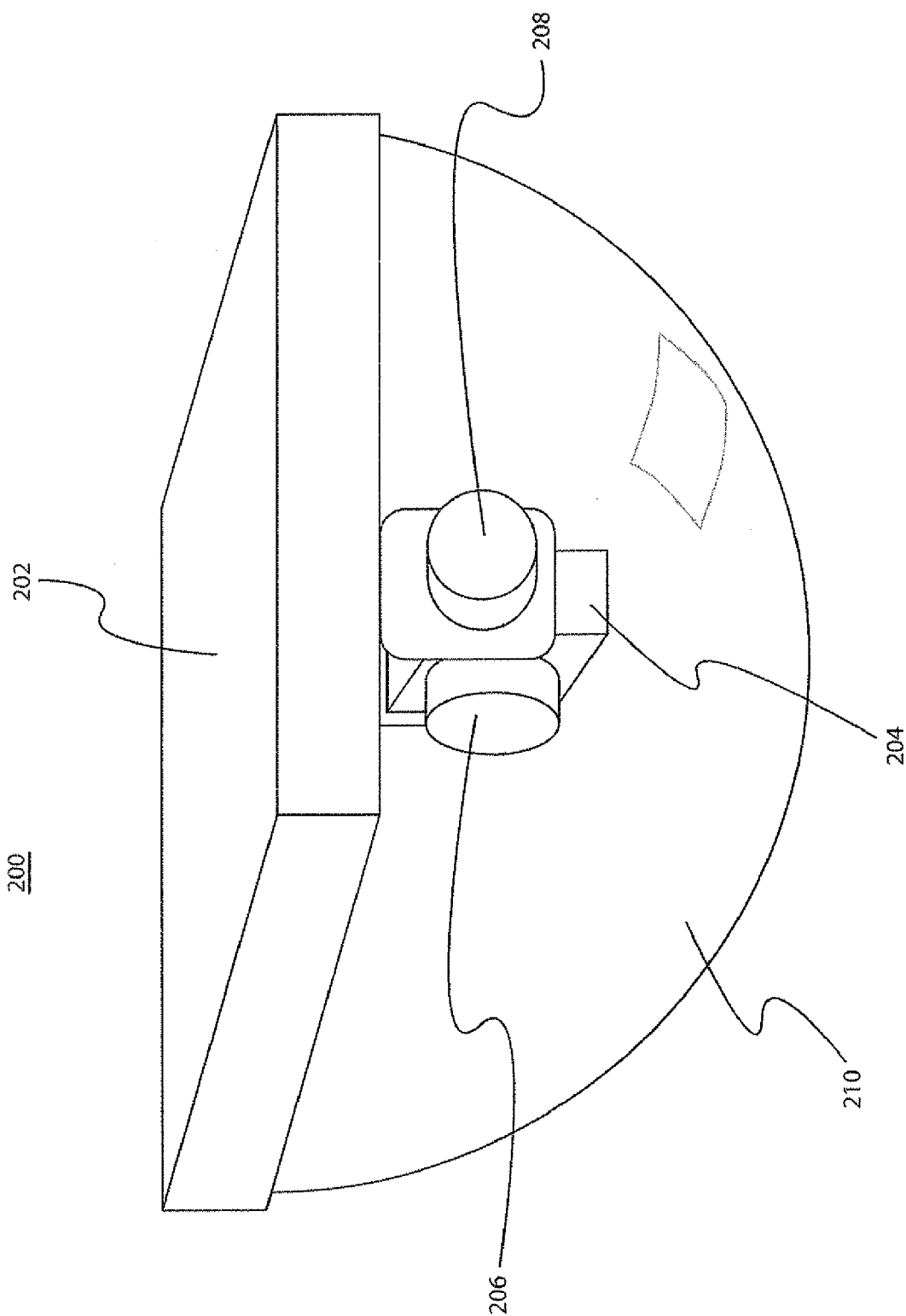
FIG. 2 illustrates a block representation of an embodiment of the present invention.

Referring to FIG. 2, a representative dome camera assembly 200 is shown. A base 202 supports a clear dome 210, preferably made of an impact resistant plastic. Within the dome 210, a camera 204 having a lens 206 is mounted on a motorized mount 208 equipped with at least one stepper motor for providing motion along an axis. The base 202 is adapted for securing to a wall ceiling or other surface.

Figure 3:
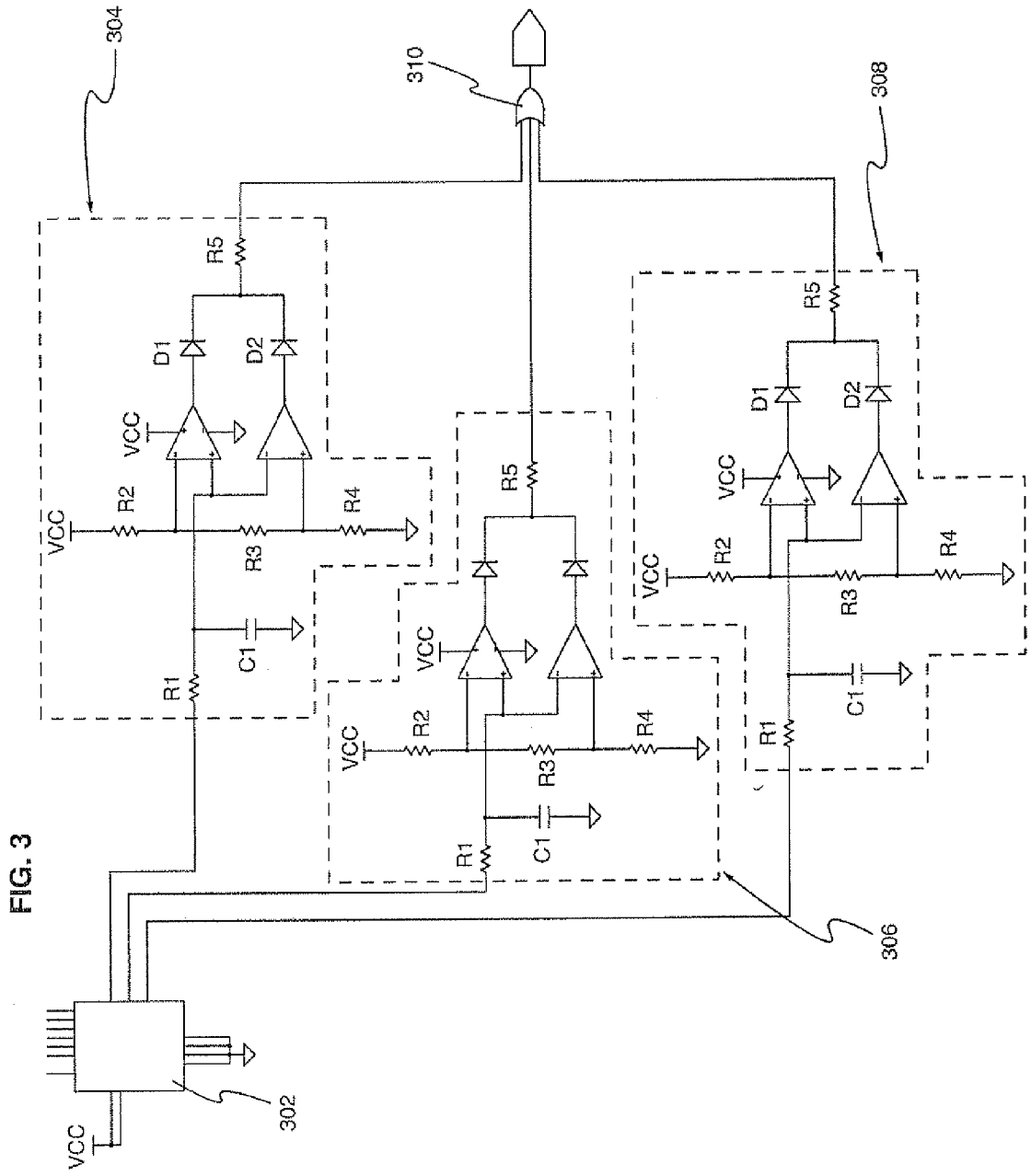
FIG. 3 illustrates a schematic representation of an acceleration detection circuit of an embodiment of the present invention.

Referring to FIG. 3, three window comparators are connected to a three axis accelerometer 302, such as Analog Devices ADXL330. The three window comparators include an X-axis comparator 304, a Y-axis comparator 306 and a Z-axis comparator 308, which are used to decode when the X, Y, and Z axes, respectively, exceed their threshold values in either a positive or negative direction. The window comparators 304-308 receive acceleration data from the accelerometer 302.

In the present description, the supply voltage, denoted by Vcc in the figures, will be taken as set to 3.3V and all calculations will be made with this value in mind. However Vcc is not limited to this value, rather any appropriate value can be used for Vcc depending on the requirements of the specific circuit.

The nominal output (0 G) of the accelerometer 302 for each axis is one-half Vcc. Therefore, the 0 G reading for each axis output is 1.65V. The output from the accelerometer 302 increases or decreases depending on changes in acceleration at a rate of ±330 mV/C, in the case of the ADXL 330. Other accelerometers that may be employed may provide outputs having a different rate. Thus, if the accelerometer used has a different rate then ±330 mV/G, the equations below will need to be adjusted to compensate for the difference.

Each window comparator 304, 306, 308 outputs are LOW when the axis acceleration is within the acceptable threshold, and are HIGH when the axis acceleration is outside the acceptable threshold. A logical OR operation is performed by the logic gate 310 on the outputs from all three axis to provide a single MOTOR_PWR_LVL_CTRL signal that is HIGH when any of the axis outputs are outside the acceptable threshold, and is LOW when all of the axis outputs are within the threshold.

The threshold values for each window comparator is set by adjusting the resistor values RX1, RX2, RX3 for the X-axis comparator 304, RY1, RY2, RY3 for the Y-axis comparator 306, and RZ1, RZ2, RZ3 for the Z-axis comparator 308. The respective resistor networks make up simple voltage dividers that set the high and low voltage thresholds for each window. Note that the axis under the influence of gravity, in this case the Z-axis, will have an offset of +1 G (330 mV). This offset must be compensated for by RZ1, RZ2, and RZ3. The actual threshold values can be empirically derived by experimenting with a dome on a shake table in order to determine at what G-levels the motors lose their position.

To set the values for the resistor network, the following example is provided for the X-axis comparator 304. The current through the resistors can be determined by the equation: IRN=Vcc÷(RX1+RX2+RX3). The voltage level of the high threshold is provided by the equation: VrefH_X=3.3V−(IRN×RX1), while the voltage level of the low threshold can be expressed as: VrefL_X=(IRN×RX3). The voltage across RX2 is given by the equation: VRX2=(IRN×RX2).

The nominal 0 G output for the X-axis comparator 304 is 3.3V÷2, or 1.65V. To set the thresholds so that the comparator triggers on an acceleration of ±0.5 G, the high threshold must be: VrefH_X=1.65V+(330 mV/G×0.5 G)=1.815V. While the low threshold must be: VrefL_X=1.65V−(330 mV/0×0.5 G)=1.335. If a resistor network current of 0.5 mA is selected, then: (RX1+RX2+RX3)=3.3V÷0.5 mA=6.6 kΩ. This means that the value of RX1 is defined by the equation: RX1=(3.3V−1.815V)÷0.5 mA=2.9 KΩ; RX3 is defined by the equation: RX3=1.335V/0.5 mA=2.67 KΩ, And RX2 is defined by the equation: RX2=6.6 kΩ−(2.9 kΩ+2.67 kΩ) 1.03 kΩ.

Preferably, precision 1% tolerance resistors should be used having values matching as close as possible to the values calculated above. As stated earlier, the Z-axis (or the axis under the influence of gravity) will have a 1 G offset due to gravity. To compensate for this, both the high and low threshold voltage levels are increased by 330 mV.

It may be necessary to expand the accelerometer's outputs near the nominal value in order to provide more resolution in low-G situations to the comparators if it is found that the motors lose their positions due to small accelerations. This can be accomplished by providing an amplifier circuit between each accelerometer output and its respective window comparator.

The simple window comparators shown in FIG. 3 do not have any hysteresis in their outputs, meaning that the output may rapidly fluctuate if the input is near a threshold value. In an actual implementation, the window comparators can be designed to have hysteresis to ensure the output does not have these sorts of fluctuations.

Figure 4:
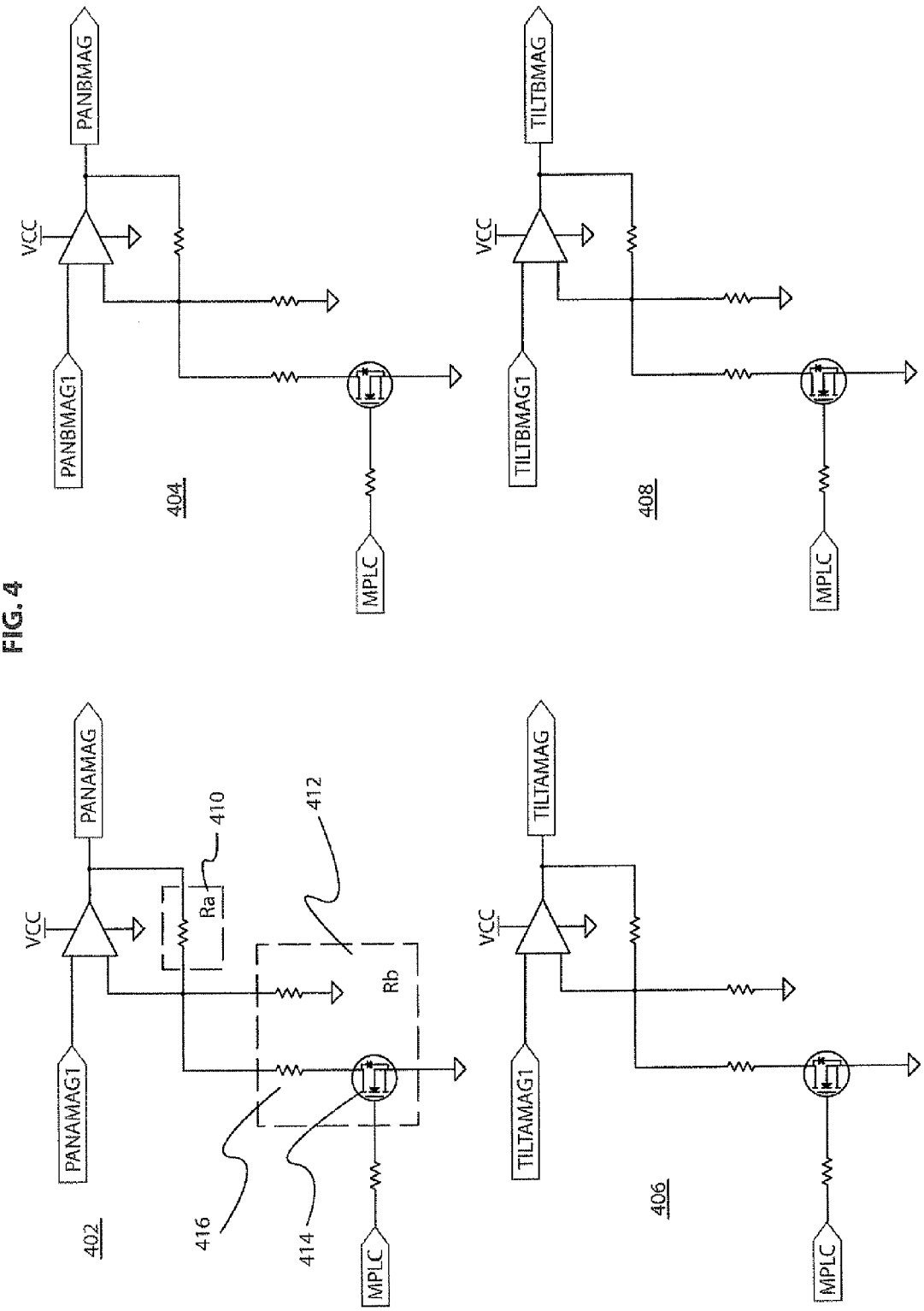
FIG. 4 illustrates a schematic representation of pan and tilt motor magnitude amplification circuits of an embodiment of the present invention.

Turning now to FIG. 4, a microcontroller (not shown) generates a full-wave rectified sine and cosine signal for both pan and tilt motors. The sine wave (denoted as PANAMAG1 or TILTAMAC1) corresponds to the each motor's A phase, while the cosine wave (denoted as PANBMAG1 or TILTBMAG1) corresponds to each motor's B phase. The wave frequency can vary from 0 Hz up to about 2 KHz. In the exemplar schematic, the peak amplitude of the waves is set to 1.5V.

Following is a description of the phase A pan motor magnitude amplifier 402. However, the circuits for the phase B of the pan motor 404 and the A and B phases of the tilt motor 406, 408 are identical to the phase A pan motor magnitude amplifier 402, and thus the description below applies to those motor magnitude amplifiers as well.

When the accelerometers detect that the dome is being accelerated due to external forces, it is desirable to increase the current into the motors so that they produce more torque and can better hold their positions. One way to do this is to increase the magnitude of the motor drive signal (PANAMAG1, etc.) in response to the accelerometer's output. The four circuit blocks 402, 404, 406, 408 on the schematic are variable gain amplifiers that perform this function. Both the phase A and phase B motor magnitude amplifiers are required for each of the two (pan and tilt) 2-phase motors.

The gain of the amplifier blocks is given as: GAIN=1+Ra+Rb. In this example, block Ra 410 is selected as a 1 KΩ resistor. The resistance in block Rb 412 is either 100K or 1K, i.e. (1K||100K≈1K), depending on the state of the MOSFET device 414.

The state of the MOSFET 414 is determined by input MOTOR_PWR_LVL_CTRL generated by the circuit shown in FIG. 3. The MOSFET 414 is considered OFF when MOTOR_PWR_LVL_CTRL is at a logical LOW, and considered ON when MOTOR_PWR_LVL_CTRL is at a logical HIGH.

When the MOSFET 414 is OFF, the MOSFET 406 has a very high resistance across the Drain and Source terminals. This effectively removes the 1 KΩ resistor (R2) 416 from the circuit. The resistance Rb 412 essentially becomes 100 KΩ, and the gain is given by the equation: GAIN=1+(1K÷100K) ≈1, which is the nominal value for the motor current into the phase winding, and thus the nominal power.

On the other hand, when the MOSFET 414 is ON, the MOSFET 414 has a very low resistance across the Drain and Source terminals, allowing the resistor R2 416 to conduct to ground normally. The resistance Rb 412 is then 1K||100K, which is now essentially 1 KΩ. This then means that the gain is: GAIN=1+(1K÷1K)=2. Consequently, the output PANAMAG is then double the magnitude of PANAMAG1. Accordingly, the current into the motor's phase winding is doubled in this case. This effectively quadruples the motor power, as the power is proportional to the square of the current.

To summarize, the PANAMAG signal has an amplitude of 1.5V (GAIN=1) when the MOTOR_PWR_LVL_CTRL is LOW, while the PANAMAG signal has an amplitude of 3.0V (GAIN=2) when the MOTOR_PWR_LVL_CTRL is HIGH. The actual values for both the resistors used in the schematic and the resulting signal levels are determined based upon evaluation of the particular dome model running on a shake table. The values used above are merely given as examples.

Figure 5:
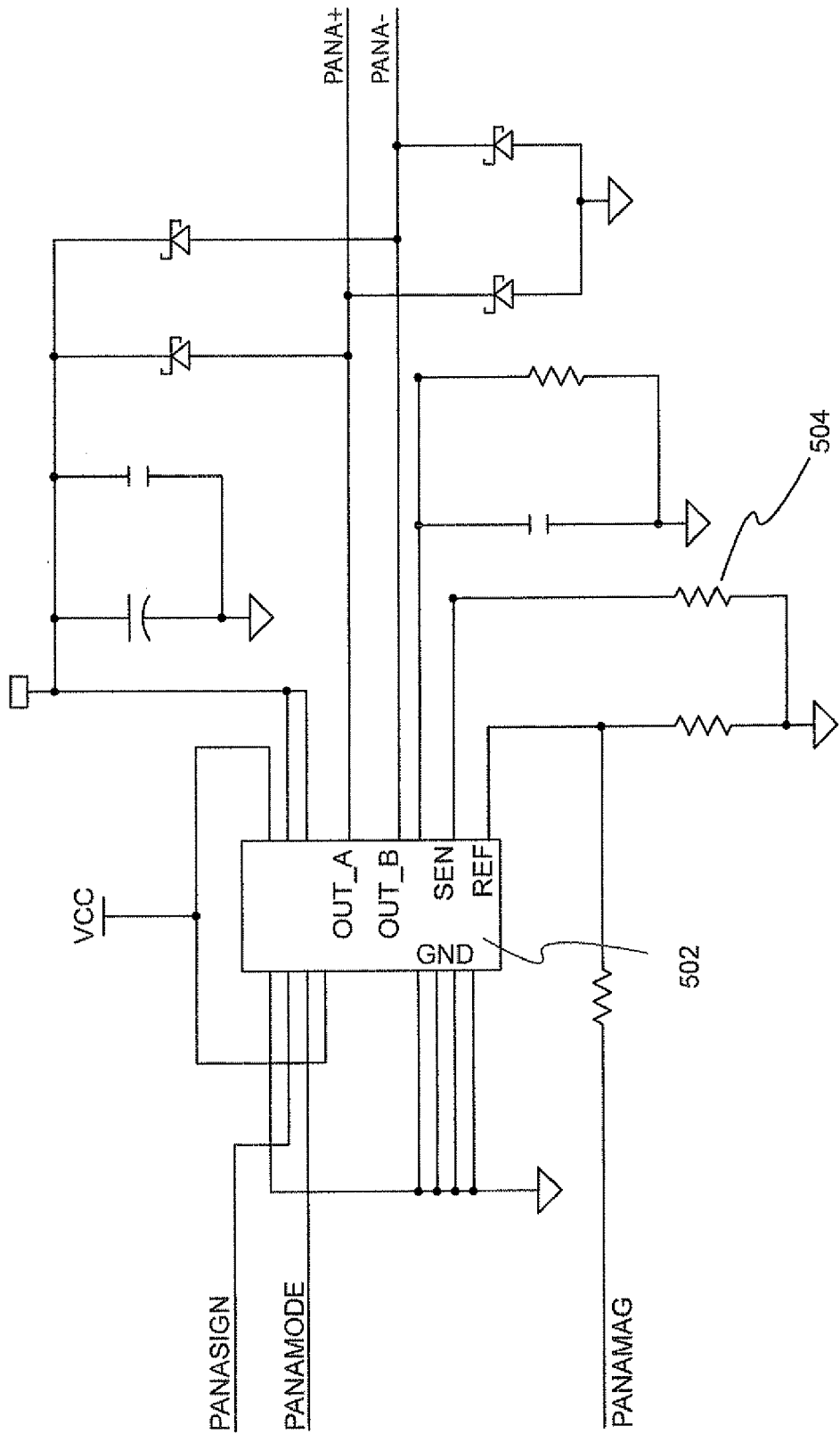
FIG. 5 illustrates a schematic representation of a motor driver circuit of an embodiment of the present invention.

Referring to FIG. 5, a schematic of a motor driver circuit is shown for providing pan and tilt functions. The circuit shown is duplicated for each of pan and tilt of each phase for a total of four motor driver circuits. For brevity, only the phase A pan motor driver circuit is discussed hereinafter. However, the other driver circuits merely receive the appropriate inputs from the appropriate circuits discussed above. For example, the phase B pan driver circuit will have as inputs PANBSIGN, PANBMODE and PANBMAG, and the phase A tilt driver will have TILTASIGN, TILTAMODE and TILTAMAG, etc.

The motor driver IC 502 forces current through the motor winding phase and sense resistor 504 so that the sense resistor voltage SEN matches the reference voltage REF. The REF voltage is the PANAMAG signal discussed earlier after it is divided down through a resistor network to a voltage approximately 0.1 times the original magnitude. The outputs PANA+ and PANA− are provided to the panning motor (not shown).

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A security camera system capable of determining a required motor holding current for reducing unwanted positional motion, said system comprising:
    a security camera;
    at least one motor arranged for moving said security camera with respect to an axis;
    an acceleration detection circuit for detecting accelerations indicative of vibrations, said accelerations detected along at least an axis of movement of said at least one motor; and
    a controlling circuit for controlling a holding current of said at least one motor in response to a magnitude of said detected accelerations.

2. The system as in claim 1, wherein said at least one motor further comprises:
    an X-axis motor arranged to rotate said security camera about an X-axis; and
    a Y-axis motor arranged to rotate said security camera about an Y-axis;
    wherein said X-axis and Y-axis are orthogonal to one another.

3. The system as in claim 2, wherein said acceleration detection circuit detects accelerations indicative of vibrations along said X-axis, Y-axis and a Z-axis orthogonal to said X-axis and said Y-axis.

4. The system as in claim 1, wherein said controlling circuit decreases said holding current when said magnitude of said detected accelerations is decreased, and increases said holding current when said magnitude of said detected accelerations is increased.

5. A method of determining a required motor holding current for reducing unwanted positional motion of a security dome camera, said method comprising:
    arranging at least one motor for rotating said security camera about an axis;
    detecting accelerations indicative of vibrations along said axis of rotation of said at least one motor; and
    controlling a holding current of said at least one stepper motor in response to a magnitude of said detected accelerations.

6. The method as in claim 5, wherein said at least one motor further comprises:
    an X-axis motor arranged to rotate said security camera about an X-axis; and
    a Y-axis motor arranged to rotate said security camera about an Y-axis,
    wherein said X-axis and Y-axis are orthogonal to one another.

7. The method as in claim 6, wherein said acceleration detection circuit detects accelerations indicative of vibrations along said X-axis, Y-axis and a Z-axis orthogonal to said X-axis and said Y-axis.

8. The method as in claim 6, wherein said holding current is decreased when said magnitude of said detected accelerations is decreased, and increases said holding current when said magnitude of said detected accelerations is increased.

9. A security camera system capable of determining a required motor holding current for reducing unwanted positional motion, said system comprising:
    a security camera;
    a first motor arranged for moving said security camera in a pan direction;
    a second motor arranged for moving said security camera in a tilt direction;
    an acceleration detection circuit for detecting accelerations indicative of vibrations; and
    a controlling circuit for controlling a holding current of said first motor and said second motor in response to a magnitude of said detected accelerations.

10. The system as in claim 9, wherein said acceleration detection circuit detects accelerations indicative of vibrations along an X-axis, a Y-axis and a Z-axis, said X-axis, said Y-axis and said Z-axis being orthogonal to each other.

11. The system as in claim 9, wherein said controlling circuit decreases said holding current when said magnitude of said detected accelerations is decreased, and increases said holding current when said magnitude of said detected accelerations is increased.

* * * * *